US009027878B2

(12) United States Patent
Simonneaux

(10) Patent No.: US 9,027,878 B2
(45) Date of Patent: May 12, 2015

(54) AIRCRAFT LANDING GEAR INCLUDING A FAIRING

(75) Inventor: Yann Simonneaux, Cheltenham (GB)

(73) Assignee: Messier-Dowty Limited, Gloucestershire (GB)

( * ) Notice: Subject to any disclaimer, the term of this patent is extended or adjusted under 35 U.S.C. 154(b) by 0 days.

(21) Appl. No.: 13/509,676

(22) PCT Filed: Apr. 30, 2010

(86) PCT No.: PCT/GB2010/050727
§ 371 (c)(1),
(2), (4) Date: Aug. 7, 2012

(87) PCT Pub. No.: WO2011/070340
PCT Pub. Date: Jun. 16, 2011

(65) Prior Publication Data
US 2012/0292442 A1    Nov. 22, 2012

(30) Foreign Application Priority Data
Dec. 7, 2009    (GB) .................................. 0921390.1

(51) Int. Cl.
B64C 25/00    (2006.01)
(52) U.S. Cl.
CPC ......... B64C 25/001 (2013.01); B64C 2025/003 (2013.01)
(58) Field of Classification Search
CPC ............ B64C 25/16; B64C 7/00; B64C 25/10
USPC ...................... 244/100, 100 R, 121
See application file for complete search history.

(56) References Cited

U.S. PATENT DOCUMENTS

| 2,176,461 | A | * | 10/1939 | Larsen ...................... 244/102 R |
| 2,390,127 | A | * | 12/1945 | Schneckloth ............ 244/11 OG |
| 2,653,846 | A | * | 9/1953 | Wiley ......................... 298/1 SG |
| 4,258,929 | A | * | 3/1981 | Brandon et al. .............. 280/851 |
| 4,352,502 | A | * | 10/1982 | Leonard et al. .............. 280/851 |
| 4,408,736 | A | * | 10/1983 | Kirschbaum et al. ..... 244/100 R |
| 4,681,285 | A | * | 7/1987 | Bowdy et al. ............. 244/103 R |
| 5,058,827 | A | * | 10/1991 | Dansereau et al. ....... 244/103 R |
| 6,619,587 | B1 | * | 9/2003 | Chow et al. ............... 244/100 R |
| 7,669,798 | B2 | * | 3/2010 | Guering et al. ................ 244/121 |
| 7,946,531 | B2 | * | 5/2011 | Jackson ........................ 244/121 |
| 8,371,524 | B2 | * | 2/2013 | Chow et al. ............... 244/102 A |
| 2006/0102775 | A1 | * | 5/2006 | Chow et al. .................. 244/1 N |
| 2007/0095977 | A1 | * | 5/2007 | Gabrys ...................... 244/103 R |
| 2009/0321559 | A1 | * | 12/2009 | Chow et al. ................... 244/1 N |

* cited by examiner

FOREIGN PATENT DOCUMENTS

SU    236252    11/2004

OTHER PUBLICATIONS

Russian Examination Report, The Federal Institute of Industrial Property, Russian Patent Application No. 2012125761/11 (039649), Apr. 18, 2014, pp. 1-3.

Primary Examiner — Isam Alsomiri
Assistant Examiner — Justin Benedik
(74) Attorney, Agent, or Firm — Hunton & Williams LLP

(57) ABSTRACT

An aircraft landing gear including a fairing (12) arranged to be moveable between first and second configurations, wherein in the first configuration the fairing shields an element of the landing gear from an incident airflow, the fairing being arranged to be in the first configuration when the landing gear is deployed but unloaded, and wherein in the second configuration the fairing exposes the landing gear element to the incident airflow, the fairing being arranged to be in the second configuration when the landing gear is deployed and loaded.

10 Claims, 5 Drawing Sheets

AIRCRAFT LANDING GEAR INCLUDING A FAIRING

Figure 1:
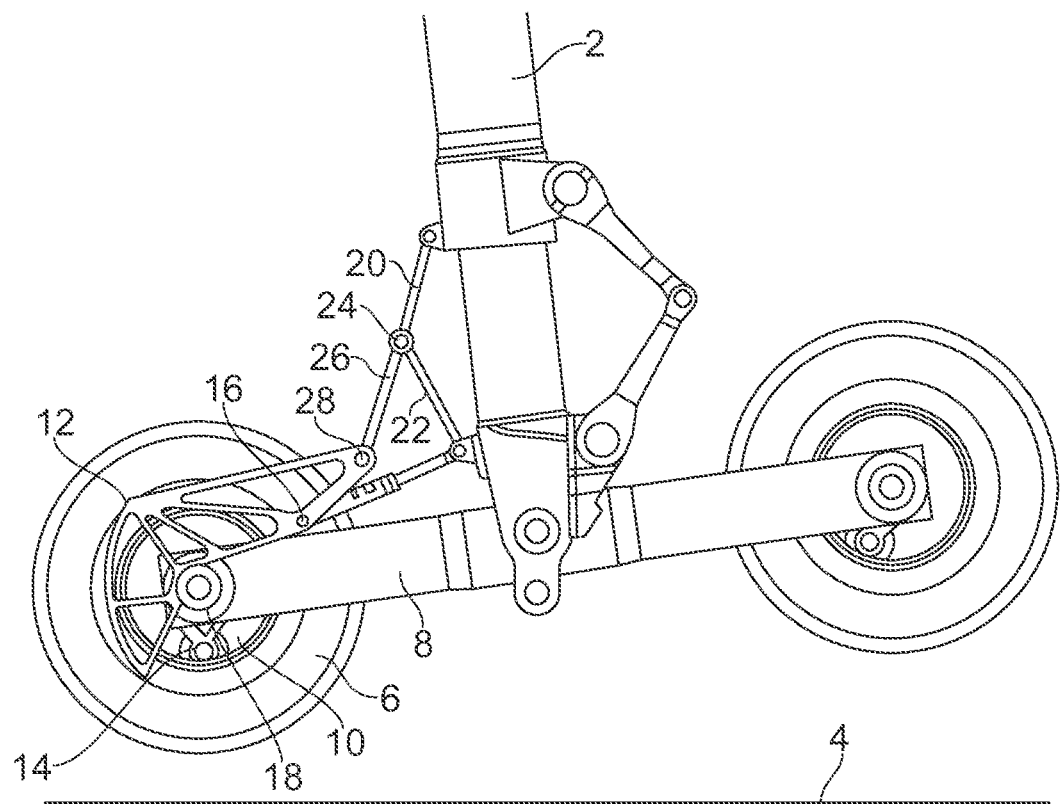

It is generally considered desirable to minimise the noise generated by aircraft, for example to reduce the disturbance and inconvenience caused to members of the public by the aircraft noise, in particular near airports. The turbulent airflow generated by the aircraft landing gear during landing and take-off generates a significant amount of noise. Of further importance to the aircraft operators is protecting the landing gear from damage caused by impact from foreign bodies.

Attempts to address these issues have included mounting fixed air-deflecting fairings to one or more parts of the aircraft landing gear. However, such fixed fairings have their own associated problems. A significant portion of the landing gear generated noise is accounted for the brakes, as a result of their complex geometry. The brakes are ordinarily applied shortly after the point of touch-down of the aircraft during landing to help slow the aircraft. Whilst applied the brakes tend to generate significant amounts of heat that is cooled by the airflow over them as the aircraft is still moving. Consequently, a fixed fairing covering the brakes, and thus shielding them from the incident airflow, significantly increases the risk of the brakes over heating in operation.

As a result, it has been know to provide aerodynamic fairings around parts of the landing gear other than the brakes, thus still allowing a significant noise to be generated from the turbulent airflow passing over the brakes and still exposing the brakes to damage from foreign body impact. Attempts have been made to overcome this problem by providing aerodynamic fairings covering the brakes that allow a portion of airflow to still pass through the fairings and over the brakes for cooling (see for example US2006/0102775).

However, the fixed fairing proposed presents an additional problem of providing access to the brakes when the aircraft is stationary, for example for maintenance. Additionally, it is common practice to provide a towing coupling or jacking point on the landing gear in the vicinity of the brakes and a fixed fairing such as that proposed by US2006/0102775 presents difficulties in accessing the towing or jacking points.

According to a first aspect of the present invention there is provided an aircraft landing gear including a fairing arranged to be moveable between first and second configurations, wherein in the first configuration the fairing shields an element of the landing gear from an incident airflow, the fairing being arranged to be in the first configuration when the landing gear is deployed but unloaded, and wherein in the second configuration the fairing exposes the landing gear element to the incident airflow, the fairing being arranged to be in the second configuration when the landing gear is deployed and loaded.

By providing a fairing that is moveable between the first and second configurations, an increased reduction in the noise generated by the landing gear whilst the aircraft is still in the air can be achieved, yet by arranging for the fairing to move to a second configuration allowing airflow to certain parts of the landing gear, such as the brakes for example, when the aircraft is on the ground the previously identified disadvantages of fixed fairings are avoided. The fairing may also be arranged to prevent a foreign body striking the landing gear element.

Whilst the element of the landing gear preferably comprises a brake, it will of course be appreciated that other elements of the landing gear, such as a jacking point or towbar, may be selectively shielded by the fairing as required.

The fairing may include a perforated portion arranged to allow some of the incident airflow to pass through. In certain circumstances it has been found that completely shielding part of the landing gear from the incident airflow can in fact increase the noise generated because turbulent air is created elsewhere by the fairing. Consequently, by allowing a restricted airflow through the fairing this alternative source of noise may be avoided.

The fairing may be pivotally coupled to the landing gear and the landing gear may include a telescopic support leg and an operating linkage coupled between the telescopic support leg and the fairing, the operating linkage being arranged to pivot the fairing between the first configuration and the second configuration as the telescopic support leg reduces in length.

In this embodiment the invention has the added advantage that movement of the fairing between the first and second configurations is accomplished mechanically by virtue of the telescopic shock leg becoming compressed as the aircraft lands and the shock leg compresses under the weight of the aircraft. This simplifies the operation and timing of the fairing movement.

The operating linkage may be connected between the fairing and one of a slave link or a torque link of the landing gear. Additionally, the fairing may be pivotally coupled to a bogie beam of the landing gear.

The landing gear may alternatively comprise an electro-mechanical or hydra-mechanical actuator connected to the fairing and arranged to move the fairing between the first and second configurations.

The aircraft landing gear may comprise a main landing gear or a nose landing gear.

Figure 2:
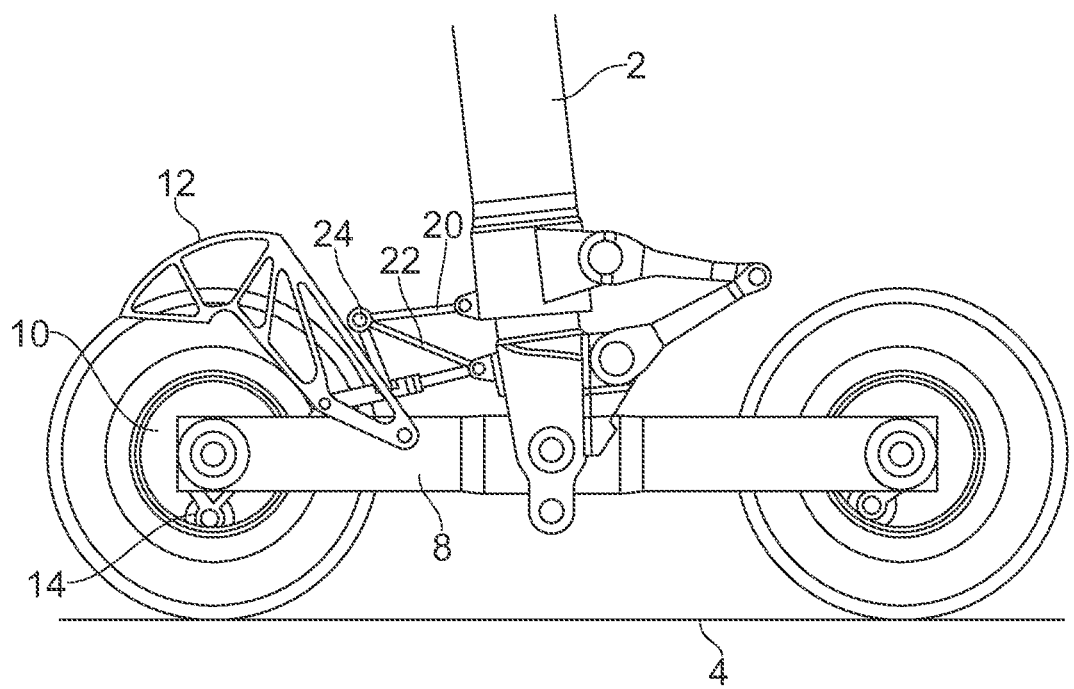
Figure 3:
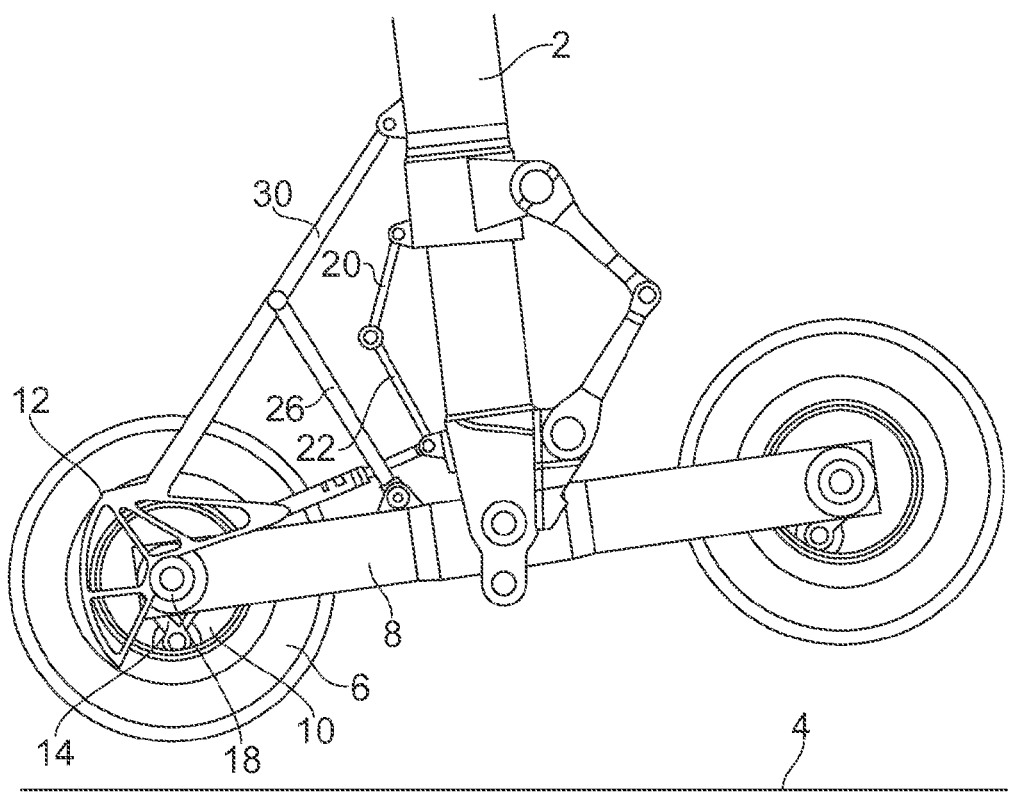
Figure 4:
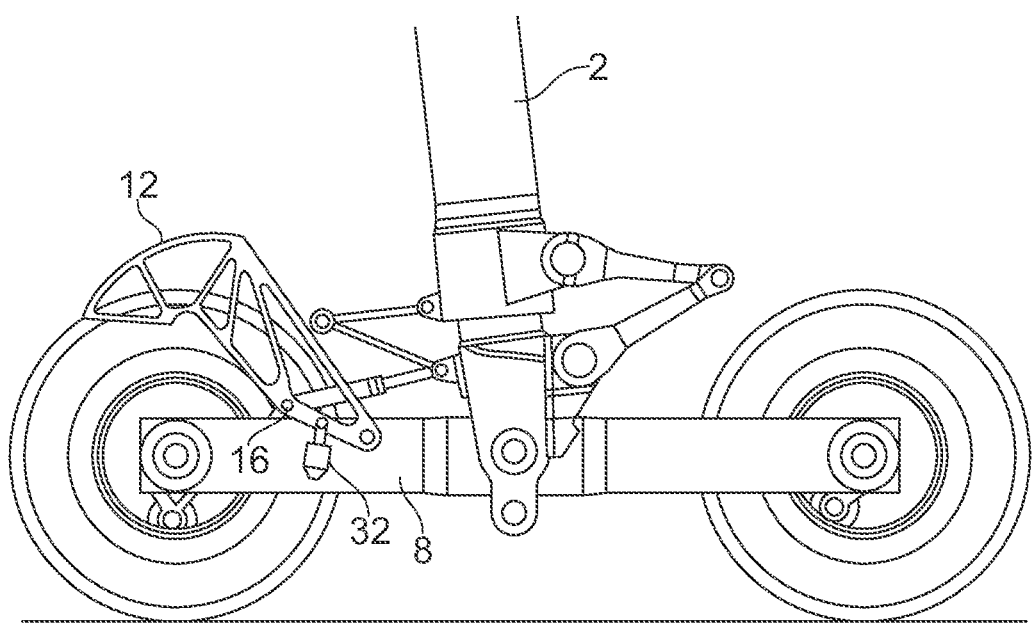
Figure 5:
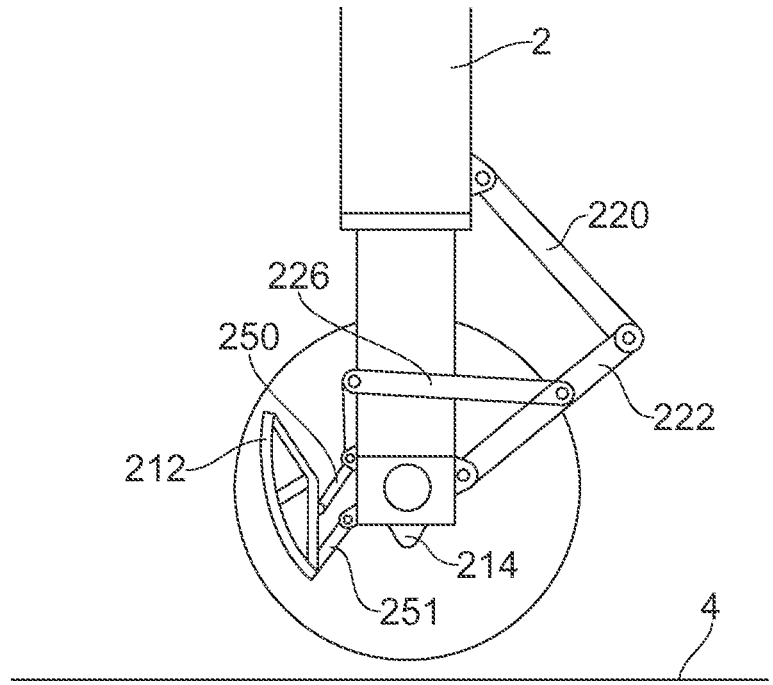
Figure 6:
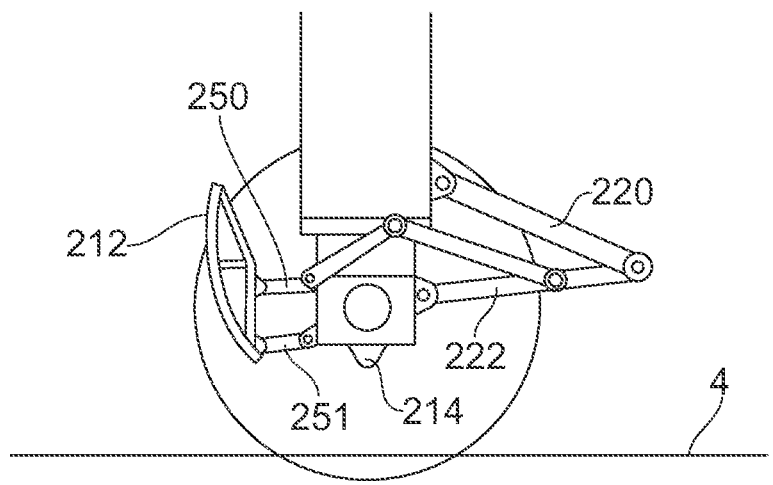

Embodiments of the present invention are described in more detail below, by way of none-limiting illustrative example, with reference to the accompanying figures, of which:

FIG. 1 schematically illustrates an aircraft landing gear according to an embodiment of the present invention in which the landing gear is unloaded;

FIG. 2 schematically illustrates the aircraft landing gear of FIG. 1 in which the landing gear is loaded;

FIG. 3 schematically illustrates an alternative embodiment of the present invention in which the landing gear is unloaded;

FIG. 4 schematically illustrates a further embodiment of the present invention with the landing gear loaded;

FIG. 5 schematically illustrates an aircraft nose landing gear in an unloaded condition in accordance with a yet further embodiment to the present invention; and FIG. 6 schematically illustrates the nose landing gear of FIG. 5 when the landing gear is loaded.

FIG. 1 schematically illustrates a first embodiment of an aircraft landing gear according to the present invention. The landing gear includes a telescopic support leg 2, shown in FIG. 1 fully extended, the landing gear being illustrated prior to coming into contact with the ground 4 and therefore unloaded. In the particular embodiment illustrated the landing gear is an aircraft main landing gear having two pairs of tyres 6 located at either end of a bogie beam 8, which in turn is pivotally connected to the lower end of the telescopic support leg 2. Each wheel has a brake 10 associated with it, the brake being of known design. A fairing 12 covers a large area at the front of the bogie beam and is wide enough to cover the forward brakes and the lower part of the bogie beam, including a jacking point 14, whilst maintaining clearances to the tyres 6. It will be appreciated that the wheels/tyres/brakes on the opposite side of the bogie to those shown have not been included for the purposes of clarity. The fairing 12 is pivotally connected by a pivot attachment 16 to the bogie beam 8. In the particular embodiment illustrated the forward wheel axle 18 provides a mechanical stop preventing further anticlockwise rotation of the fairing 12 about the pivot point 16. The landing gear includes a forward slave link comprising an upper slave link arm 20 and a lower slave link arm 22 pivotally connected to the upper slave link arm 20 at a central apex joint 24. An operating link 26, such as a rigid metal bar, is pivotally connected at one end to the apex joint 24 of the slave link and at its other end to a further pivot joint 28 of the fairing 12.

FIG. 2 shows the main landing gear illustrated in FIG. 1 after touch-down of the aircraft on the ground 4. As can be seen, the telescopic support leg 2 is now compressed and as a result the upper and lower slave link arms 20, 22 have been compressed towards one another, in turn decreasing the separation between the apex joint 24 and the bogie beam 8. This has caused the operating linkage 26 to exert a downward force on the fairing 12 through the articulated connection between the operating linkage 26 and fairing 12. This has caused the fairing 12 to rotate clockwise about the pivot attachment 16 between the fairing and bogie beam such that the fairing no longer shields the forward brakes 10 from the airflow, allowing full cooling of the brakes. Additionally, as the fairing remains rotated away from the brakes even after the aircraft has come to a complete standstill due to the continued compression of the telescopic support leg, access to either the brakes or jacking point 14 is maintained.

The fairing may be arranged such that it prevents foreign bodies or other debris from striking the brakes or other elements of the landing gear when it is in the first (lowered) configuration. To allow this the fairing may be constructed from a material sufficiently strong to resist impact from such foreign bodies, such as a metal alloy or fibre reinforced plastic. The fairing may be designed to withstand such impacts without damage or may be designed to absorb the impact energy by deforming or collapsing in a controlled manner.

An alternative embodiment of an aircraft landing gear according to the present invention is illustrated in FIG. 3, with the telescopic support leg 2 again being fully extended, i.e. unloaded. In the embodiment shown in FIG. 3, the fairing 12 is not pivotally attached to the bogie beam 8 but instead is pivotally attached to the upper portion of the telescopic support leg 2 via an extension arm 30. The operating linkage 26 is pivotally attached at one end to the extension arm 30, approximately mid way between the attachment point of the extension arm to the telescopic support leg and the main body of the fairing, and is pivotally attached at its opposite to the bogie beam 8. Consequently, as the telescopic support leg 2 is compressed following touch down of the aircraft the extension arm 30 and hence fairing 12 are rotated upwardly relative to the bogie beam and brakes 10 by the operating linkage 26. Whilst not as space efficient as the arrangement of the first embodiment shown in FIGS. 1 and 2, the mechanical arrangement shown in FIG. 3 removes the need for attachment to the slave link and any likely consequential modifications of the slave link required. The skilled person will of course appreciate that various other mechanical configurations of the fairing and linkage to the telescopic support leg are possible and will be substantially dictated by the mechanical arrangement of the remaining components of the aircraft landing gear in combination with space and weight considerations.

FIG. 4 illustrates a further embodiment of an aircraft landing gear according to the present invention. In the embodiment illustrated in FIG. 4 the fairing 12 is pivotally attached to the bogie beam 8 in a similar fashion to the first embodiment illustrated in FIGS. 1 and 2. However, there is no direct mechanical linkage provided between the fairing 12 and the telescopic support leg 2. Instead, a telescopic actuator 32 is provided pivotally attached between the fairing 12 and bogie beam 8. In FIG. 4 the actuator is shown in the fully retracted condition, which causes the fairing 12 to be rotated clockwise about its pivot point 16 with the bogie beam, exposing the brakes to the airflow and allowing access to brakes and jacking points. The telescopic actuator 32 could equally be replaced with a rotary actuator acting directly on the pivot point 16 of the fairing. In the embodiment illustrated in FIG. 4 appropriate control and power connections, not illustrated, are required to the actuator 32.

FIG. 5 schematically illustrates a nose landing gear according to an embodiment of the present invention. The nose landing gear includes a telescopic support leg 2 to which a wheel assembly 210 is directly attached at a lower end of the support leg. A fairing 212 is pivotally attached to the lower end of the support leg by means of two parallel support links 250, 251. A torque link comprising an upper torque link arm 220 and a lower torque link arm 222 is pivotally connected between upper and lower portions of the telescopic support leg in a known manner. An operating linkage 226 is pivotally connected between the lower torque link 222 and the upper support link 250. The nose landing gear of this embodiment of the present invention is shown in FIG. 5 with the telescopic support leg 2 fully extended, i.e. prior to touchdown of the aircraft. Consequently, the fairing 12 is in a first configuration in which it shields the lower elements of the landing gear from the airflow and or foreign body impacts. As illustrated in FIG. 6, when the aircraft touches down the resulting compression of the telescopic support leg 2 causes the torque link to compress, in turn pulling the operating linkage 226 rearwards, thus causing the upper (and lower) support links to rotate clockwise and causing the fairing to move upwards and clear access to the lower elements of the landing gear, such as the jacking point 214, for maintenance or jacking operations.

In further embodiments of the present invention the fairing 12, 212 may either be completely impervious to the incident airflow, or may include a perforated portion, such as a mesh area, that allows some, but not all, of the incident airflow to pass through the fairing and pass over the brakes, since in some circumstances this may contribute further to the noise reduction over completely shielding the brake arrangement from the airflow.

An aircraft landing gear and fairing according to embodiments of the present invention are more efficient at noise reduction compared with a fixed fairing because it can fully cover the front brakes while the aircraft is still in the air, yet allow full airflow on those same brakes after touch-down. Normal access to the jacking point is also maintained without effecting the ground support equipment.

The invention claimed is:

1. An aircraft landing gear including a fairing pivotally coupled to the landing gear and arranged to be moveable between first and second configurations, wherein in the first configuration the fairing shields an element of the landing gear from an incident airflow, the fairing being arranged to be in the first configuration when the landing gear is deployed but unloaded, wherein in the second configuration the fairing exposes the landing gear element to the incident airflow, the fairing being arranged to be in the second configuration when the landing gear is deployed and loaded, and wherein the landing gear includes a telescopic support leg and an operating linkage coupled between the telescopic support leg and the fairing, the operating linkage being arranged to pivot the fairing between the first configuration and the second configuration as the telescopic support leg reduces in length.

2. An aircraft landing gear according to claim 1, wherein the landing gear element comprises a brake, jacking point or tow-bar.

3. An aircraft landing gear according to claim 1 or 2, wherein the fairing includes perforated portion arranged to allow some of the incident airflow to pass through.

4. An aircraft landing gear according to claim 1 or 2, wherein the fairing is arranged to prevent a foreign body from striking the landing gear element.

5. An aircraft landing gear according to claim 1, wherein the operating linkage is connected between the fairing and one of a slave link or a torque link of the landing gear.

6. An aircraft landing gear according to claim 1 or 5, wherein the fairing is pivotally coupled to a bogie beam of the landing gear.

7. An aircraft landing gear according to claim 1 or 2 further comprising a electro-mechanical or hydra-mechanical actuator connected to the fairing and arranged to move the fairing between the first and second configurations.

8. An aircraft landing gear according to claim 1, 2 or 5, wherein the landing gear comprises a main landing gear or a nose landing ear.

9. An aircraft landing gear according to claim 1, wherein the fairing is movably attached to the landing gear element by an attachment.

10. An aircraft landing gear according to claim 9, wherein the attachment is a pivot attachment and the fairing is rotatable about the pivot attachment relative to the landing gear element.

\* \* \* \* \*